United States Patent [19]

Corsan et al.

[11] Patent Number: 5,367,408
[45] Date of Patent: Nov. 22, 1994

[54] FASTENING AND CONNECTING DEVICE, MORE PARTICULARLY FOR A LIGHT INTENSIFIER ASSEMBLY ON AN IMAGE GENERATOR OF A PILOT'S HELMET VIEWFINDER

[75] Inventors: Philippe Corsan, Andernos-Les-Bains; Patrick Jolly, Le Pian Medoc; Olivier Farvacque, Bruges, all of France

[73] Assignee: Sextant Avionique, Meudon la Foret, France

[21] Appl. No.: 8,363

[22] Filed: Jan. 22, 1993

[30] Foreign Application Priority Data

Jan. 24, 1992 [FR] France .................. 92 00784

[51] Int. Cl.$^5$ ........................... G02B 07/02
[52] U.S. Cl. ..................... 359/894; 359/827
[58] Field of Search ............ 359/894, 819, 827, 828, 359/830

[56] References Cited

U.S. PATENT DOCUMENTS

| | | | |
|---|---|---|---|
| 2,788,709 | 4/1957 | Huebner | 359/819 |
| 3,971,933 | 7/1976 | Adamson, Jr. | 250/213 VT |
| 4,572,612 | 2/1986 | Schlapp et al. | 359/827 |
| 4,592,096 | 6/1986 | Glasheen | 2/427 |
| 4,600,277 | 7/1986 | Murray, Jr. | 350/561 |
| 4,670,912 | 6/1987 | Hart | 2/209.1 |
| 4,703,879 | 11/1987 | Kastendieck et al. | 224/181 |
| 5,054,886 | 10/1991 | Ozaki et al. | 359/819 |

FOREIGN PATENT DOCUMENTS

| | | | |
|---|---|---|---|
| 0098989 | 1/1984 | European Pat. Off. | |
| 0280452 | 8/1988 | European Pat. Off. | |
| 1065244 | 5/1954 | France | 359/894 |
| 0019842 | 9/1892 | Germany | 359/828 |
| 2632263 | 1/1978 | Germany | |

*Primary Examiner*—Edward K. Look
*Assistant Examiner*—Mark Sgantzos
*Attorney, Agent, or Firm*—Kerkam, Stowell, Kondracki & Clarke

[57] ABSTRACT

This device is characterized in that it includes removable indexing and locking devices of the light intensifier assembly on the stationary imager operating in combination with opening and closing control devices of a light shutter of said stationary imager in such a way that the locking or unlocking of the intensifier assembly simultaneously causes the opening or closing of shutter, and that all the operations can be carried out with one hand only and blindly.

7 Claims, 2 Drawing Sheets

FASTENING AND CONNECTING DEVICE, MORE PARTICULARLY FOR A LIGHT INTENSIFIER ASSEMBLY ON AN IMAGE GENERATOR OF A PILOT'S HELMET VIEWFINDER

FIELD OF THE INVENTION

The present invention relates to a fastening device, more particularly for a detachable light intensifier assembly on a stationary imager of a viewfinder system for an aircraft pilot's helmet. For instance, it may concern a helmet provided with optoelectronic equipment, designed for the aeronautics and, more particularly, for use by aircraft and helicopter pilots.

BACKGROUND OF THE INVENTION

The optoelectronic equipment is commonly designated as a viewfinder and comprises a first element: the imager, made up of an image generator and an associated optical device for transporting the image in front of the eye, a second element being added to it for use during night flights: the light intensifier.

In this particular technical field, it is important that the fastening or connection of any element to the helmet might be carried out by the pilot, with one hand only and blindly, so as not to distract his attention from the instrument board during a mission.

SUMMARY OF THE INVENTION

The first object of the present invention is to provide a fastening device for a light intensifier assembly on a stationary imager making such a result possible.

The second object of the invention is to provide, on removal of the light intensifier assembly, for the protection of the imager against all harmful effects arising from external agents, such as dust or stray light, and this by achieving its closing in an automatic way, precisely at the time of removal.

It should be clearly understood that reversibility shall be possible in the same way at the time of the remounting of the light intensifier.

In order to accomplish the above identified objects, the present invention provides a fastening device, more particularly for a detachable light intensifier assembly on a stationary imager of a viewfinder system for an aircraft pilot's helmet, characterized in that it includes removable indexing and locking means for the light intensifier assembly on the stationary imager, operating in combination with opening and closing control means for a light shutter of said stationary imager, in such a way that the locking or unlocking of the intensifier assembly produces simultaneously the opening or closing of the shutter, thus making all the operations possible with one hand only and blindly.

BRIEF DESCRIPTION OF THE DRAWINGS

The invention will be better understood and other features thereof will become more readily apparent from the following description when taken in conjunction with the accompanying schematic drawings, illustrating, by way of non-limitative example, how the invention can be implemented, and wherein.

DETAILED DESCRIPTION OF PREFERRED EMBODIMENTS

A helmet, for which the optoelectronic equipment or viewfinder 1 is intended, is known in itself and has not been illustrated.

Figure 1:
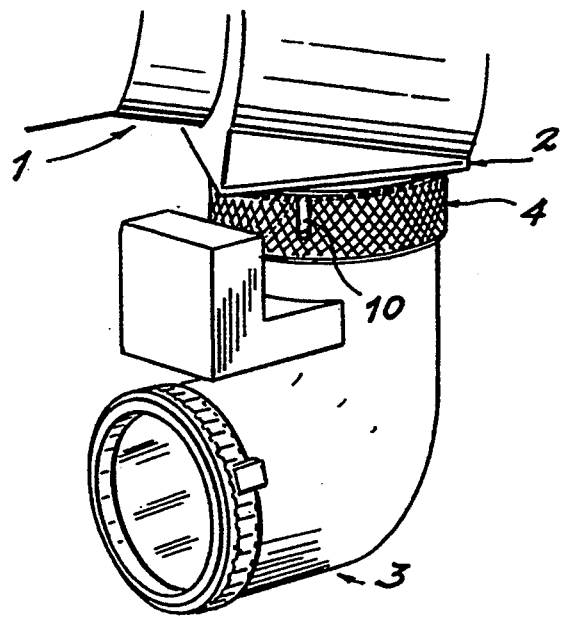
FIG. 1 is a perspective view of a light intensifier mounted on a helmet viewfinder imager.

As shown in FIG. 1, the viewfinder 1 comprises, at its lower part, a stationary image generator, or imager 2, on which a light intensifier assembly 3 is fastened through a connecting and fastening device according to the invention.

This device includes removable indexing and locking means for the light intensifier assembly 3 on the stationary imager 2, consisting of a ring 4 rotatably mounted at the end of said light intensifier 3, which is adapted to cooperate with a corresponding shaft 5 of the imager 2 through at least one pin 6 arranged radially on the shaft 5 of the imager 2, rotationally cooperating with a corresponding inner groove 7 originating in the end face 4a of ring 4 and extending in its bore 4b towards the opposite face 4c of said ring 4.

In the circumstances, the pins 6 are three in number, spaced apart by an angle of 120° and uniformly distributed on the periphery of said shaft 5 of the imager 2.

Of course, a different number of pins 6, whether uniformly distributed or not, can be considered, for example in order to achieve locking after a rotation of 60° only.

In the present example of application, the groove 7 provided in the bore 4b of ring 4 is helical, so as to ensure a progressive locking of the intensifier 3 onto the imager 2.

But the invention makes also provision for the fact that the groove 7, provided in the bore 4a of ring 4, can be constituted by an axial section extended by a section perpendicular to the former one, in order to obtain a "bayonet" type locking.

For an easier gripping and the prevention of any sliding, the locking ring 4 is knurled on its outer side face 4d and includes two actuating fingers 8, which are diametrically opposite and radially disposed on said outer face 4d of ring 4.

According to the invention, the device further comprises opening or closing control means for the light shutter 9 of the stationary imager 2, which consist of an axial control pin 10 mechanically connected with the shutter 9 and insertable into a corresponding open slot 11, axially provided in the rotary ring 4 in such a way that the latter rotates said control pin 10 of the shutter 9, consequently causing the opening or closing of the latter.

Figure 2:
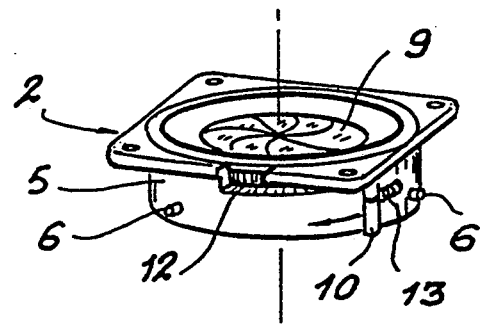
FIG. 2 is an exploded perspective view according to FIG. 1.
Figure 2:
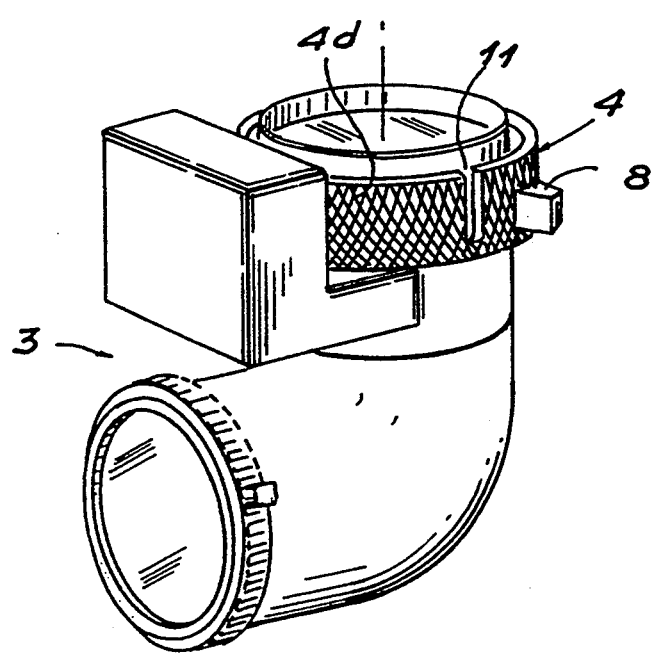
Figure 3:
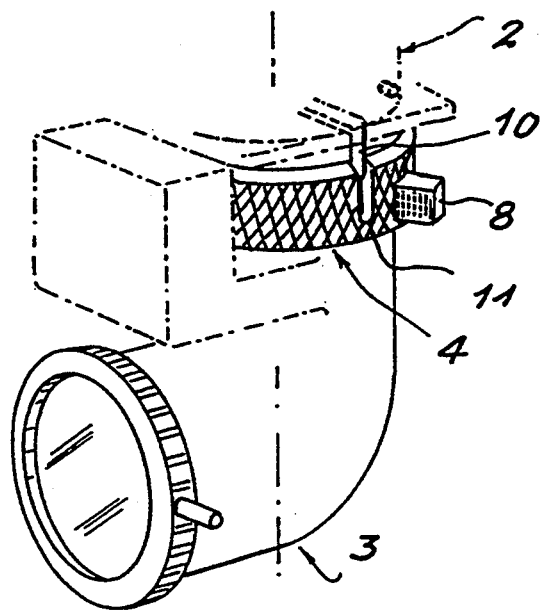
FIGS. 3 and 4 are views respectively showing the indexing and the locking of a light intensifier on a imager.
Figure 4:
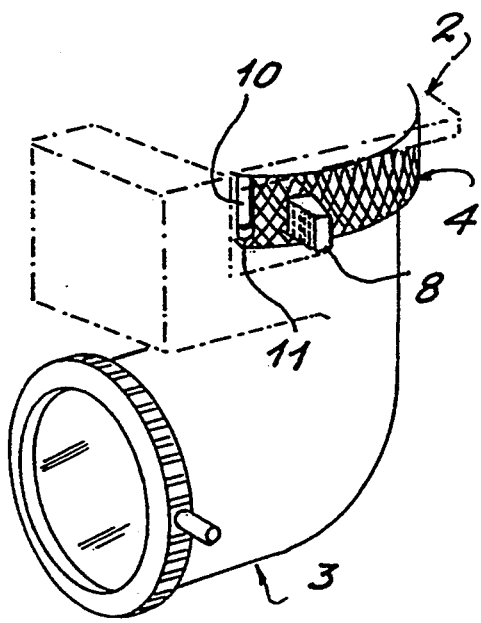
Figure 5:
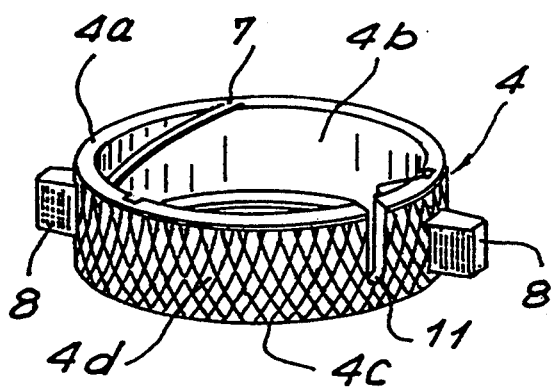
FIG. 5 is a perspective view of a locking ring ensuring the connection between the light intensifier and the imager.

As illustrated in FIG. 2, the control pin 10 is capable of rotatively moving between two stops defined by the ends of an aperture 12, made in the wall of shaft 5 of the imager 2.

Lastly, it should be noted that the rotation control of the control pin 10 of shutter 9 is effected, as regards opening, against a return-to-closing spring 13.

Thus, the indexing and locking means are capable of making the light intensifier 3 detachable with respect to the stationary imager 2 and of operating in combination with the opening and closing control means of the light shutter 9 of said stationary imager 2.

In this manner and according to the object in view, the locking or unlocking of the intensifier assembly 3 simultaneously involves the opening or closing of shutter 9, in such a way that all the operations can be carried out with one hand only and blindly.

The operation and implementation of such a device are the following:

when the pilot wishes to connect the light intensifier 3 with the imager 2, he holds said intensifier in one hand in order to index it blindly with respect to the imager 2 thanks, on the one hand, to the groove 11 of ring 4 attempting to position itself on the control pin 10 of shutter 9, by a slow search rotation exerted on the ring 4 by the pilot and, on the other hand, to the pins 6 of imager 2, which are insertable into the helical grooves 7 of ring 4, for guidance therein, by means of an effective rotation of such ring.

It will be readily understood that the locking effect of the pins 6 in the helical grooves 7 thereafter ensures simultaneously the opening of shutter 9, since its control pin 10 is then engaged with the open axial slot 11 of such ring 4 which is rotated, and conversely.

While this invention has been described in conjunction with specific embodiments thereof, it is evident that many alternatives, modifications and variations thereof will be apparent to those skilled in the art. Accordingly, the preferred embodiments of the invention, as set forth herein, are intended to be illustrative, not limiting. Various changes may be made without departing from the spirit and scope of the invention as defined herein and in the following claims.

We claim:

1. A fastening device for a detachable light intensifier assembly on a stationary imager of a viewfinder system for an aircraft pilot's helmet, said fastening device comprising: removable indexing and locking means for the light intensifier assembly on the stationary imager operatively coupled with opening and closing control means for a light shutter of said stationary imager, wherein locking or unlocking of the intensifier assembly causes simultaneous opening or closing of the shutter.

2. The device according to claim 1, wherein the removable indexing and locking means of the light intensifier assembly on the stationary imager comprises: a ring rotatably mounted at an end of said light intensifier, said ring for coupling to a corresponding shaft of the imager through at least one pin arranged radially on the shaft of the imager, said pin rotationally cooperating with a corresponding inner groove originating in an end face of said ring and extending in its bore towards an opposite face of said ring.

3. The device according to claim 2, wherein the groove provided in the bore of the ring is helical.

4. The device according to claim 2, wherein the groove provided in the bore of the ring is an axial section extended by a section perpendicular to said axial section.

5. The device according to claim 1, wherein the opening and closing control means of the light shutter of the stationary imager comprises: an axial control pin mechanically connected with the shutter and insertable into a corresponding open slot, axially provided in the rotary ring wherein said rotary ring rotates the control pin of the shutter, causing the opening or closing of the shutter.

6. The device according to claim 5, wherein rotation control of the control pin of the shutter is effected against a return-to-closing spring.

7. The device according to claim 2, wherein said rotary ring further comprises at least one radial actuating finger disposed on its outer periphery.

* * * * *